UNITED STATES PATENT OFFICE.

CHARLES LENNIG, OF PHILADELPHIA, PENNSYLVANIA.

IMPROVEMENT IN PROCESSES OF MANUFACTURING ALUMINIC SULPHATE AND ALUM.

Specification forming part of Letters Patent No. 191,160, dated May 22, 1877; application filed August 7, 1876.

*To all whom it may concern:*

Be it known that I, CHARLES LENNIG, of the city and county of Philadelphia, and State of Pennsylvania, have invented certain new and useful Improvements in the Manufacture of Sulphate of Alumina and Alum; and I do hereby declare the following to be a full, clear, and exact description of the same.

Heretofore, in the manufacture of sulphates of alumina and alum, the clay or kaolin has been treated with sulphuric acid and in an open vessel to dissolve the alumina.

By this process the quantities of alumina dissolved are extremely variable, and seldom, if ever, exceed two-thirds of the contained alumina. This necessarily occasions great waste of alumina, and the production of a solution of irregular composition.

To obviate this and more nearly succeed in dissolving all the alumina, thus obtaining more uniform and saturated solutions, is the object of my invention; and it consists in subjecting the kaolin or clay to the action of sulphuric acid in a closed vessel, under pressure, as will be hereinafter more fully described.

The clay or kaolin properly prepared in the ordinary manner employed in the old process is treated with the quantity of sulphuric acid required for the alumina contained in the clay or kaolin in a closed vessel of a suitable capacity.

Pressure is produced by the reaction caused either by heating the mixture by the introduction of steam into it, or by applying heat outwardly thereto, or by mixing the prepared clay or kaolin with the sulphuric acid in a sufficiently warm condition to produce a reaction, which readily and violently arises.

This pressure causes the acid to dissolve almost or quite all the alumina contained in the clay or kaolin.

The vessel in which the operation is performed should be sufficiently strong to resist the sudden and violent pressure caused by the reaction, and should be provided with a safety-valve or safety-valves to relieve the pressure when too great.

It is preferable to maintain this vessel, by a steam-jacket or direct fire, at a temperature sufficient to prevent the contents from cooling until the reaction is finished. This is not, however, absolutely necessary.

When the process is finished the pressure generated in the closed vessel has ceased, and the contents of the vessel are withdrawn and treated in the usual manner.

What I claim as new, and desire to secure by Letters Patent, is—

The process of dissolving the alumina contained in clay or kaolin by subjecting the clay or kaolin to the action of sulphuric acid under pressure in a closed vessel, substantially as described.

CHARLES LENNIG.

Witnesses:
   E. WEISS,
   JOHN B. LENNIG.